(12) United States Patent
Yamaguchi et al.

(10) Patent No.: US 10,414,128 B2
(45) Date of Patent: *Sep. 17, 2019

(54) INTERLAYER FOR LAMINATED GLASS AND LAMINATED GLASS

(71) Applicant: SEKISUI CHEMICAL CO., LTD., Osaka, Osaka (JP)

(72) Inventors: Kouhei Yamaguchi, Kouka (JP); Yasuyuki Izu, Kouka (JP); Masako Okamoto, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/562,681

(22) PCT Filed: Mar. 29, 2016

(86) PCT No.: PCT/JP2016/060277
§ 371 (c)(1),
(2) Date: Sep. 28, 2017

(87) PCT Pub. No.: WO2016/159028
PCT Pub. Date: Oct. 6, 2016

(65) Prior Publication Data
US 2018/0086030 A1   Mar. 29, 2018

(30) Foreign Application Priority Data

Mar. 30, 2015 (JP) ................. 2015-069403
Mar. 30, 2015 (JP) ................. 2015-069404
Mar. 30, 2015 (JP) ................. 2015-069405
Mar. 30, 2015 (JP) ................. 2015-069406

(51) Int. Cl.
| | |
|---|---|
| *B32B 17/10* | (2006.01) |
| *H01J 49/10* | (2006.01) |
| *H01J 49/40* | (2006.01) |
| *B32B 7/02* | (2019.01) |
| *B32B 27/22* | (2006.01) |
| *C08K 5/098* | (2006.01) |

(52) U.S. Cl.
CPC ............ *B32B 17/1055* (2013.01); *B32B 7/02* (2013.01); *B32B 17/10* (2013.01); *B32B 17/10036* (2013.01); *B32B 17/10688* (2013.01); *B32B 17/10761* (2013.01); *B32B 27/22* (2013.01); *C08K 5/098* (2013.01); *H01J 49/10* (2013.01); *H01J 49/40* (2013.01); *B32B 2255/26* (2013.01); *B32B 2307/102* (2013.01); *B32B 2307/412* (2013.01); *B32B 2315/08* (2013.01); *B32B 2398/20* (2013.01); *B32B 2605/006* (2013.01)

(58) Field of Classification Search
CPC ..... B32B 17/10; B32B 7/02; B32B 17/10761; B32B 27/22; B32B 17/10688; B32B 17/1055; B32B 2307/412; B32B 2605/006; B32B 2315/08; B32B 2398/20; H01J 49/10; H01J 49/40; B08K 5/098
USPC ......................................................... 428/437
See application file for complete search history.

(56) References Cited

U.S. PATENT DOCUMENTS

| | | |
|---|---|---|
| 2007/0009714 A1 | 1/2007 | Lee et al. |
| 2007/0178314 A1 | 8/2007 | Marumoto |
| 2007/0231544 A1 | 10/2007 | Stenzel |
| 2008/0233352 A1 | 9/2008 | Smith et al. |
| 2010/0028585 A1 | 2/2010 | Shimatani |
| 2010/0233453 A1 | 9/2010 | Hashimoto |
| 2011/0151269 A1 | 6/2011 | Hatta et al. |
| 2013/0288061 A1 | 10/2013 | Kitano et al. |
| 2015/0246508 A1 | 9/2015 | Oota et al. |

(Continued)

FOREIGN PATENT DOCUMENTS

| | | |
|---|---|---|
| CN | 101049733 A | 10/2007 |
| CN | 101111459 A | 1/2008 |

(Continued)

OTHER PUBLICATIONS

International Search Report for the Application No. PCT/JP2016/060277 dated May 31, 2016.
International Search Report for the Application No. PCT/JP2016/060276 dated Jun. 21, 2016.
International Search Report for the Application No. PCT/JP2016/060278 dated May 31, 2016.
International Search Report for the Application No. PCT/JP2016/060275 dated Jun. 21, 2016.
Written Opinion of the International Searching Authority (PCT/ISA/237) for the Application No. PCT/JP2016/060277 dated May 31, 2016.

(Continued)

*Primary Examiner* — William K Cheung
(74) *Attorney, Agent, or Firm* — Cheng Law Group, PLLC

(57) ABSTRACT

There is provided an interlayer film for laminated glass which is high in moisture resistance and has a moderate adhesive force. In the interlayer film for laminated glass according to the present invention, when a process composed of sputtering and measurement by TOF-SIMS is performed n times and n $Ratio_n$s of Ion Intensity of Potassium/Ion Intensity of Thermoplastic Resin obtained from the first to n-th sputtering and measurement processes are collected to calculate an average value$_{1 \leq n \leq 10}$ of 10 values of $Ratio_{1 \leq n \leq 10}$ measured within a range of $1 \leq n \leq 10$ and an average value$_{1 \leq n \leq 150}$ values of $Ratio_{1 \leq n \leq 150}$ measured within a range of $1 \leq n \leq 150$, the average value$_{1 \leq n \leq 10}$ is more than 1.1 times the average value$_{1 \leq n \leq 150}$.

9 Claims, 2 Drawing Sheets

(56) References Cited

U.S. PATENT DOCUMENTS

| | | | |
|---|---|---|---|
| 2015/0251385 A1 | 9/2015 | Oota et al. | |
| 2015/0258752 A1* | 9/2015 | Oota | C09K 11/06 428/437 |
| 2018/0037711 A1 | 2/2018 | Kitano et al. | |

FOREIGN PATENT DOCUMENTS

| | | |
|---|---|---|
| CN | 101410341 A | 4/2009 |
| CN | 101626992 A | 1/2010 |
| CN | 102089254 A | 6/2011 |
| CN | 102634167 A | 8/2012 |
| CN | 103261113 A | 8/2013 |
| CN | 104411652 A | 3/2015 |
| JP | 8-119686 A | 5/1996 |
| JP | 9-241045 A | 9/1997 |
| JP | 9-295839 A | 11/1997 |
| JP | 2003-261360 A | 9/2003 |
| JP | 2007-70200 A | 3/2007 |
| JP | 2007-276475 A | 10/2007 |
| JP | 2008-544878 A | 12/2008 |
| JP | 2010-530815 A | 9/2010 |
| JP | 2010-228959 A | 10/2010 |
| JP | 2015-30850 A | 2/2015 |
| WO | WO-2014/051142 A1 | 4/2014 |
| WO | WO-2015/037142 A1 | 3/2015 |
| WO | WO-2015/040663 A1 | 3/2015 |

OTHER PUBLICATIONS

Written Opinion of the International Searching Authority (PCT/ISA/237) for the Application No. PCT/JP2016/060276 dated Jun. 21, 2016.
Written Opinion of the International Searching Authority (PCT/ISA/237) for the Application No. PCT/JP2016/060278 dated May 31, 2016.
Written Opinion of the International Searching Authority (PCT/ISA/237) for the Application No. PCT/JP2016/060275 dated Jun. 21, 2016.
Non-Final Office Action for the U.S. Appl. No. 15/562,568 from the United States Patent and Trademark Office dated Dec. 3, 2018.
Supplementary European Search Report for the Application No. EP 16 772 907.8 dated Sep. 26, 2018.
Supplementary European Search Report for the Application No. EP 16 772 908.6 dated Sep. 26, 2018.
Supplementary European Search Report for the Application No. EP 16 772 909.4 dated Sep. 24, 2018.
Supplementary European Search Report for the Application No. EP 16 772 910.2 dated Sep. 24, 2018.
Non-Final Office Action for the U.S. Appl. No. 15/562,754 from United States Patent and Trademark Office dated Feb. 22, 2019.
Restriction Requirement Office Action for the U.S. Appl. No. 15/562,836 from United States Patent and Trademark Office dated Jun. 12, 2019.
The First Office Action for the Application No. 201680019279.5 from the State Intellectual Property Office of the People's Republic of China dated Jul. 3, 2019.
The First Office Action for the Application No. 201680019280.8 from the State Intellectual Property Office of the People's Republic of China dated Jul. 1, 2019.
The First Office Action for the Application No. 201680019297.3 from the State Intellectual Property Office of the People's Republic of China dated Jul. 3, 2019.
Notification of Reasons for Refusal for the Application No. 2016-520165 from Japan Patent Office dated Jul. 16, 2019.
Notification of Reasons for Refusal for the Application No. 2016-520180 from Japan Patent Office dated Jul. 16, 2019.

* cited by examiner

[FIG. 1]
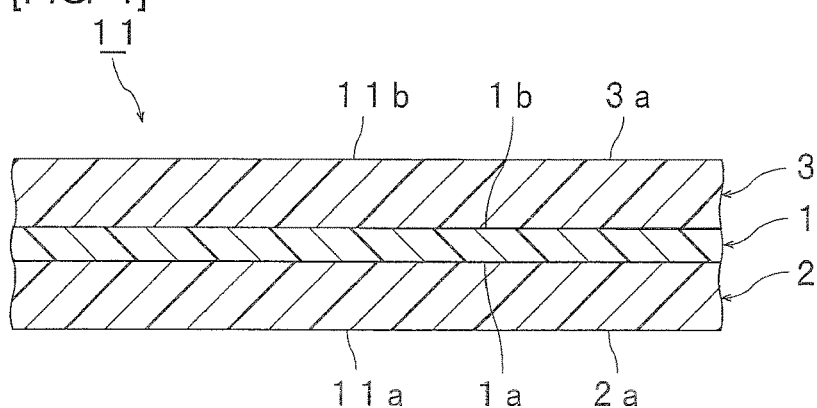
[FIG. 2]
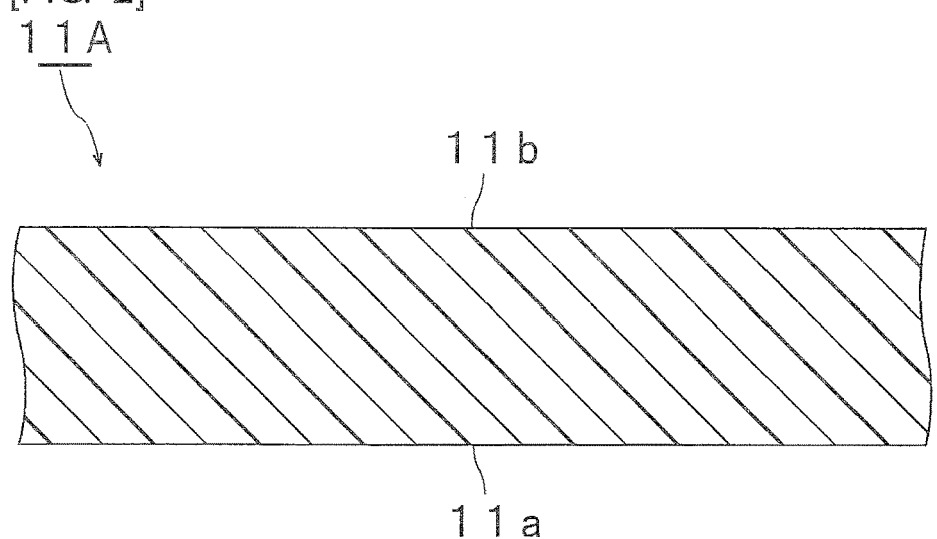
[FIG. 3]
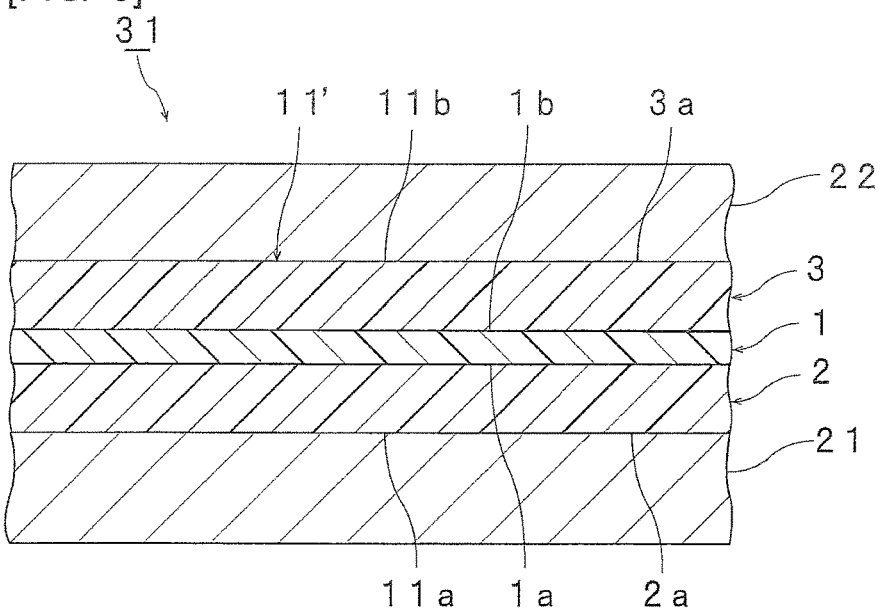

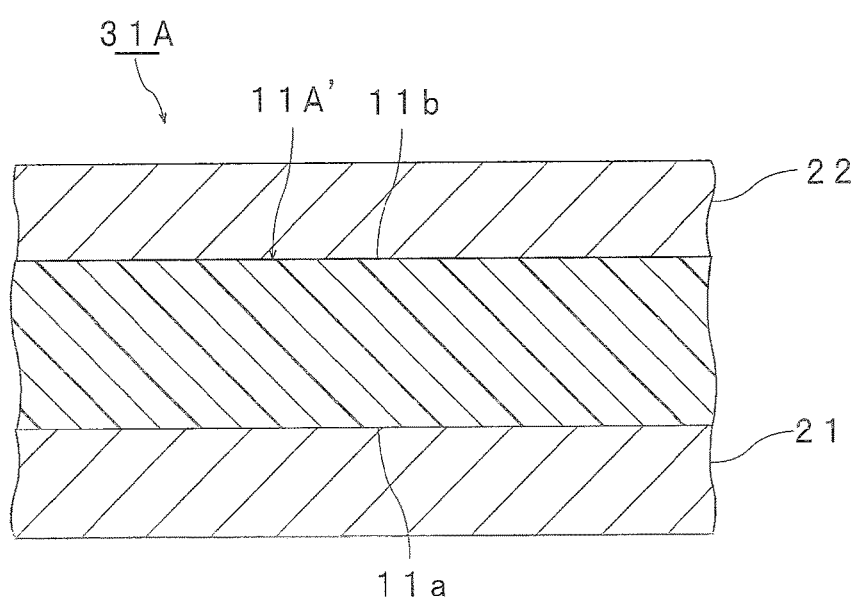
[FIG. 4]

INTERLAYER FOR LAMINATED GLASS AND LAMINATED GLASS

This application is a national stage of PCT International Application No. PCT/JP2016/060277 filed in Japan on Mar. 29, 2016, which claims priority of Japanese Patent Application No. 2015-069403 filed in Japan on Mar. 30, 2015, Japanese Patent Application No. 2015-069404 filed in Japan on Mar. 30, 2015, Japanese Patent Application No. 2015-069405 filed in Japan on Mar. 30, 2015, and Japanese Patent Application No. 2015-069406 filed in Japan on Mar. 30, 2015, the entire contents of which are hereby incorporated herein by reference.

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

Moreover, in general, since the adhesive force between an interlayer film and a glass plate is too high, laminated glass fails to absorb the impact at a collision when a human body or the like collides with the laminated glass. As such, in order to weaken the adhesive force between an interlayer film and a glass plate, an alkali metal salt, an alkaline earth metal salt, and the like are used.

As an example of the interlayer film for laminated glass prepared with an alkali metal salt or an alkaline earth metal salt, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight.

RELATED ART DOCUMENT

Patent Document

Patent Document 1: JP 2007-070200 A

SUMMARY OF THE INVENTION

Problems to be Solved by the Invention

Even when at least one kind of metal salt among an alkali metal salt and an alkaline earth metal salt is added in order to weaken the adhesive force, the adhesive force sometimes fails to be lowered. Moreover, in order to adjust the adhesive force between an interlayer film and a glass plate, there are cases where a compound containing potassium is used. However, when a compound containing potassium is singly used, there are cases where adjusting the adhesive force is difficult. Even if a compound containing potassium and a compound containing magnesium are used in combination, there are cases where adjusting the adhesive force is difficult. On the other hand, there is a problem that, when a compound containing magnesium is excessively added, this causes the moisture resistance of laminated glass to be lowered.

In laminated glass prepared with a conventional interlayer film as described in Patent Document 1, there is a problem that achieving both high moisture resistance and moderate adhesive force is difficult.

Moreover, an interlayer film and laminated glass are used in various environments and the interlayer film is sometimes changed in its water content. There is a problem that, when the interlayer film is changed in its water content, the adhesive force to a glass plate is liable to vary.

An object of the present invention is to provide an interlayer film for laminated glass which is high in moisture resistance and has a moderate adhesive force. Moreover, the present invention is also aimed at providing laminated glass prepared with the interlayer film for laminated glass.

Means for Solving the Problems

According to a broad aspect of the present invention, there is provided an interlayer film for laminated glass having a one-layer structure or a two or more-layer structure, containing a thermoplastic resin, and containing at least one kind among a magnesium salt and an alkaline earth metal salt, when a portion on a first surface of the interlayer film is measured for $Ratio_0$ of Ion Intensity of Potassium/Ion Intensity of Thermoplastic Resin with the use of TOF-SIMS, then, a sputtering and measurement process in which the first surface portion measured for $Ratio_0$ is subjected to sputtering one time and measured for Ratio of Ion Intensity of Potassium/Ion Intensity of Thermoplastic Resin with the use of TOF-SIMS is performed n times, and n $Ratio_n$s of Ion Intensity of Potassium/Ion Intensity of Thermoplastic Resin obtained from the first to n-th sputtering and measurement processes are collected to calculate an average $value_{1 \leq n \leq 10}$ of 10 values of $Ratio_{1 \leq n \leq 10}$ measured within a range of $1 \leq n \leq 10$ and an average $value_{1 \leq n \leq 150}$ of 150 values of $Ratio_{1 \leq n \leq 150}$ measured within a range of $1 \leq n \leq 150$, the average $value_{1 \leq n \leq 10}$ being more than 1.1 times the average $value_{1 \leq n \leq 150}$.

In a specific aspect of the interlayer film for laminated glass according to the present invention, the average $value_{1 \leq n \leq 10}$ of 10 values of $Ratio_{1 \leq n \leq 10}$ measured within a range of $1 \leq n \leq 10$ is 1.1 times or more of the average $value_{51 \leq n \leq 60}$ of 10 values of $Ratio_{51 \leq n \leq 60}$ measured within a range of $51 \leq n \leq 60$.

In a specific aspect of the interlayer film for laminated glass according to the present invention, the average $value_{1 \leq n \leq 10}$ of 10 values of $Ratio_{1 \leq n \leq 10}$ measured within a range of $1 \leq n \leq 10$ is 1.25 times or more of the average $value_{1 \leq n \leq 150}$ of 150 values of $Ratio_{1 \leq n \leq 150}$ measured within a range of $1 \leq n \leq 150$.

In a specific aspect of the interlayer film for laminated glass according to the present invention, a surface layer positioned at the first surface side contains magnesium.

In a specific aspect of the interlayer film for laminated glass according to the present invention, the content of magnesium in a surface layer positioned at the first surface side is less than 50 ppm.

In a specific aspect of the interlayer film for laminated glass according to the present invention, the content of potassium in a surface layer positioned at the first surface side is 300 ppm or less.

In a specific aspect of the interlayer film for laminated glass according to the present invention, the thermoplastic resin is a polyvinyl acetal resin.

In a specific aspect of the interlayer film for laminated glass according to the present invention, when a portion on a second surface of the interlayer film is measured for $Ratio_0$ of Ion Intensity of Potassium/Ion Intensity of Thermoplastic Resin with the use of TOF-SIMS, then, a sputtering and measurement process in which the second surface portion measured for $Ratio_0$ is subjected to sputtering one time and measured for Ratio of Ion Intensity of Potassium/Ion Intensity of Thermoplastic Resin with the use of TOF-SIMS is performed m times, and m $Ratio_m$s of Ion Intensity of Potassium/Ion Intensity of Thermoplastic Resin obtained from the first to m-th sputtering and measurement processes are collected to calculate an average $value_{1 \leq m \leq 10}$ of 10 values of $Ratio_{1 \leq m \leq 10}$ measured within a range of $1 \leq m \leq 10$ and an average $value_{1 \leq m \leq 150}$ of 150 values of $Ratio_{1 \leq m \leq 150}$ measured within a range of $1 \leq m \leq 150$, the average $value_{1 \leq m \leq 10}$ is more than 1.1 times the average $value_{1 \leq m \leq 150}$.

According to a broad aspect of the present invention, there is provided laminated glass including a first lamination glass member, a second lamination glass member and an interlayer film part arranged between the first lamination glass member and the second lamination glass member, the interlayer film part being formed of the above-described interlayer film for laminated glass.

Effect of the Invention

Since the interlayer film for laminated glass according to the present invention has a one-layer structure or a two or more-layer structure, contains a thermoplastic resin, and contains at least one kind among a magnesium salt and an alkaline earth metal salt and, when the first surface side is measured as above and n $Ratio_n$s of Ion Intensity of Potassium/Ion Intensity of Thermoplastic Resin obtained from the first to n-th sputtering and measurement processes are collected to calculate an average $value_{1 \leq n \leq 10}$ of 10 values of $Ratio_{1 \leq n \leq 10}$ measured within a range of $1 \leq n \leq 10$ and an average $value_{1 \leq n \leq 150}$ of 150 values of $Ratio_{1 \leq n \leq 150}$ measured within a range of $1 \leq n \leq 150$, the average $value_{1 \leq n \leq 10}$ is more than 1.1 times the average $value_{1 \leq n \leq 150}$, laminated glass prepared with the interlayer film can be made to become high in moisture resistance and to have a moderate adhesive force.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODE(S) FOR CARRYING OUT THE INVENTION

Hereinafter, the details of the present invention will be described.

The interlayer film for laminated glass (hereinafter, sometimes described as the interlayer film) according to the present invention has a one-layer structure or a two or more-layer structure. The interlayer film according to the present invention may have a one-layer structure and may have a two or more-layer structure. The interlayer film according to the present invention may have a two-layer structure and may have a three or more-layer structure. The interlayer film according to the present invention is provided with a first layer. The interlayer film according to the present invention may be a single-layered interlayer film provided with only the first layer and may be a multi-layered interlayer film provided with the first layer and another layer.

The interlayer film according to the present invention contains a thermoplastic resin. The interlayer film according to the present invention contains at least one kind among a magnesium salt and an alkaline earth metal salt. The interlayer film according to the present invention has a first surface and a second surface opposite to the first surface. The first surface and the second surface are oppositely directed. The first surface is a surface on which a first lamination glass member is layered. The second surface is a surface on which a second lamination glass member is layered.

With the use of TOF-SIMS, a portion on a first surface of the interlayer film according to the present invention is measured for $Ratio_0$ of Ion Intensity of Potassium/Ion Intensity of Thermoplastic Resin.

Next, a sputtering and measurement process in which the first surface portion measured for $Ratio_0$ is subjected to sputtering one time and measured for Ratio of Ion Intensity of Potassium/Ion Intensity of Thermoplastic Resin with the use of TOF-SIMS is performed n times, n $Ratio_n$s of Ion Intensity of Potassium/Ion Intensity of Thermoplastic Resin obtained from the first to n-th sputtering and measurement processes are collected.

For example, when the sputtering and measurement process is performed 150 times, 150 Ratios of Ion Intensity of Potassium/Ion Intensity of Thermoplastic Resin obtained from the first to 150th sputtering and measurement processes are collected. For example, in the second sputtering and measurement process, the first surface portion measured for $Ratio_1$ is subjected to sputtering and measurement. In the third sputtering and measurement process, the first surface portion measured for $Ratio_2$ is subjected to sputtering and measurement.

In the interlayer film according to the present invention, (Number 1 requirement) the average $value_{1 \leq n \leq 10}$ of 10 values of $Ratio_{1 \leq n \leq 10}$ measured within a range of $1 \leq n \leq 10$ is more than 1.1 times the average $value_{1 \leq n \leq 150}$ of 150 values of $Ratio_{1 \leq n \leq 150}$ measured within a range of $1 \leq n \leq 150$.

In the present invention, by being provided with the above-mentioned constitution, laminated glass prepared with the interlayer film can be made to become high in moisture resistance and to have a moderate adhesive force. Even if the interlayer film is changed in its water content, the adhesive force can be moderately maintained.

In general, since the adhesive force between an interlayer film and a glass plate is too high, laminated glass fails to absorb the impact at a collision when a human body or the like collides with the laminated glass. As such, in order to weaken the adhesive force between an interlayer film and a glass plate, an alkali metal salt, an alkaline earth metal salt, and the like are used.

However, even when at least one kind of metal salt among an alkali metal salt and an alkaline earth metal salt is added in order to weaken the adhesive force, the adhesive force sometimes fails to be lowered. Moreover, in order to adjust the adhesive force between an interlayer film and a glass plate, there are cases where a compound containing potassium is used. However, when a compound containing potassium is singly used, there are cases where adjusting the adhesive force is difficult. Even if a compound containing potassium and a compound containing magnesium are used in combination, there are cases where adjusting the adhesive force is difficult. Furthermore, there is a problem that the adhesive force of an interlayer film to a glass plate varies depending on the water content in the interlayer film. On the other hand, when magnesium is excessively added, there is a problem that the moisture resistance of laminated glass is lowered. When an excess amount of only a compound containing potassium is used to lower the adhesive force of an interlayer film to a glass plate, there is a problem that the moisture resistance of laminated glass is lowered.

It has been presumed by the present inventors that, in order to control the adhesive force of an interlayer film to a glass plate without lowering the moisture resistance of laminated glass when a compound containing potassium and a compound containing magnesium are used in combination, adjusting the distribution state of potassium in the thickness direction of the interlayer film is effective and the present inventors have conducted studies on the relationship between the distribution state of potassium in the thickness direction of the interlayer film and each of the moisture resistance of laminated glass and the moderate adhesive force. As a result of the studies, the present inventors have found that there is a connection between the distribution state of potassium in the surface portion of an interlayer film and each of the moisture resistance of laminated glass and the moderate adhesive force.

Based on the findings, with regard to the constitution enabling laminated glass to exhibit high moisture resistance and moderate adhesive force, the present inventors have found that an interlayer film needs only to satisfy the above-mentioned Number 1 requirement.

Furthermore, in the present invention, even when the interlayer film is changed in its water content, moderate adhesive force can be maintained.

The interlayer film needs only to satisfy the above-mentioned Number 1 requirement on the first surface thereof. High moisture resistance and moderate adhesive force are attributed to the first surface and exhibited on the first surface side.

With the use of TOF-SIMS, a portion on a second surface of the interlayer film according to the present invention is measured for $Ratio_0$ of Ion Intensity of Potassium/Ion Intensity of Thermoplastic Resin.

Next, a sputtering and measurement process in which the second surface portion measured for $Ratio_0$ is subjected to sputtering one time and measured for Patio of Ion Intensity of Potassium/Ion Intensity of Thermoplastic Resin with the use of TOF-SIMS is performed m times, m $Ratio_m$s of Ion Intensity of Potassium/Ion Intensity of Thermoplastic Resin obtained from the first to m-th sputtering and measurement processes are collected.

For example, when the sputtering and measurement process is performed 150 times, 150 Ratios of Ion Intensity of Potassium/Ion Intensity of Thermoplastic Resin obtained from the first to 150th sputtering and measurement processes are collected. For example, in the second sputtering and measurement process, the second surface portion measured for $Ratio_1$ is subjected to sputtering and measurement. In the third sputtering and measurement process, the second surface portion measured for $Ratio_2$ is subjected to sputtering and measurement.

In the interlayer film according to the present invention, it is preferred that (Number 1' requirement) the average $value_{1\leq m\leq 10}$ of 10 values of $Ratio_{1\leq m\leq 10}$ measured within a range of $1\leq m\leq 10$ be more than 1.1 times the average $value_{1\leq m\leq 150}$ of 150 values of $Ratio_{1\leq m\leq 150}$ measured within a range of $1\leq m\leq 150$.

By making the interlayer film satisfy the Number 1 requirement and satisfy the Number 1' requirement on both surface sides thereof, high moisture resistance and moderate adhesive force are attributed to both of the first surface and the second surface and exhibited on both of the first surface side and the second surface side.

From the viewpoints of further enhancing the moisture resistance and effectively adjusting the adhesive force within a moderate range, the average $value_{1\leq n\leq 10}$ is preferably 1.2 times or more, more preferably 1.25 times or more, and further preferably 1.3 times or more, of the average $value_{1\leq n\leq 150}$. The average $value_{1\leq n\leq 10}$ is preferably 3 times or less of the average $value_{1\leq n\leq 150}$.

From the viewpoints of further enhancing the moisture resistance and effectively adjusting the adhesive force within a moderate range, the average $value_{1\leq m\leq 10}$ is preferably 1.2 times or more, more preferably 1.25 times or more, and further preferably 1.3 times or more, of the average $value_{1\leq m\leq 150}$. The average $value_{1\leq m\leq 10}$ is preferably 3 times or less of the average $value_{1\leq m\leq 150}$.

From the viewpoints of further enhancing the moisture resistance and effectively adjusting the adhesive force within a moderate range, the average $value_{1\leq n\leq 10}$ of 10 values of $Ratio_{1\leq n\leq 10}$ measured within a range of $1\leq n\leq 10$ is preferably 1.2 times or more, more preferably 1.25 times or more, and further preferably 1.3 times or more, of the average $value_{51\leq n\leq 60}$ of 10 values of $Ratio_{51\leq n\leq 60}$ measured within a range of $51\leq n\leq 60$. The average $value_{1\leq n\leq 10}$ is preferably 3 times or less of the average $value_{51\leq n\leq 60}$.

From the viewpoints of further enhancing the moisture resistance and effectively adjusting the adhesive force within a moderate range, the average $value_{1\leq m\leq 10}$ of 10 values of $Ratio_{1\leq m\leq 10}$ measured within a range of $1\leq m\leq 10$ is preferably 1.2 times or more, more preferably 1.25 times or more, and further preferably 1.3 times or more, of the average $value_{51\leq m\leq 60}$ of 10 values of $Ratio_{51\leq m\leq 60}$ measured within a range of $51\leq m\leq 60$. The average $value_{1\leq m\leq 10}$ is preferably 3 times or less of the average $value_{51\leq m\leq 60}$.

From the viewpoints of further enhancing the moisture resistance and effectively adjusting the adhesive force within a moderate range, each of the average $value_{1\leq n\leq 10}$ and the average $value_{1\leq m\leq 10}$ is preferably 0.2 or more, more preferably 0.3 or more, further preferably 0.4 or more, preferably 3 or less, more preferably 2.5 or less, further preferably 2 or less, and especially preferably 1.5 or less.

Examples of a method of making the interlayer film satisfy the Number 1 requirement or the Number 1' requirement include a method of shortening the time taken for washing an extrusion-molded interlayer film with water and subjecting the interlayer film to an annealing treatment, a method of subjecting an extrusion-molded interlayer film to an annealing treatment under a condition of 100° C. or more, and the like. Examples of a method of washing an interlayer film with high temperature water to shorten the time required for washing and subjecting the interlayer film to an annealing treatment include a method of immersing an interlayer film in water at 20° C. or less for 10 to 60 seconds and then subjecting the inter layer film to an annealing treatment at 100 to 150° C. By adopting such a method, the distribution state of potassium in the surface portion of an interlayer film can be adjusted, and by making an interlayer film contain at least one kind among magnesium and an alkaline earth metal salt, the moisture resistance of laminated glass is enhanced and an interlayer film having a moderate adhesive force can be obtained.

Specifically, measurement and analysis by TOF-SIMS (time-of-flight secondary ion mass spectrometry) are performed as follows.

Using "TOF-SIMS 5" available from ION-TOF GmbH, the surface of an interlayer film is measured by a dual beam method in which the $Bi_{3++}$ ion gun is adopted as a primary ion source for measurement and the $C_{60+}$ ion (voltage: 20 keV, current 1 nA) is adopted as a sputter source for sputtering. The sputtering area is set to 800 μm×800 μm. The sputter analysis area is set to 500 μm×500 μm. Since sputtering and measurement are alternately repeated, distribution of respective ions in the depth direction from a surface can be evaluated.

The number of sputter times is taken as abscissa, the intensity ratio of the secondary ion in every sputtering is taken as ordinate, and measured values are plotted. The relationship between the number of sputtering times and the secondary ion intensity is graphically shown to obtain a depth profile.

Specifically, measurement conditions for TOF-SIMS are as follows.

Primary ion: 25 keV, $Bi_{3++}$, 0.1 to 0.2 pA (pulse current value). Random scan mode Primary ion scan range (measurement region): 500 μm×500 μm Secondary ion detection mode: positive
Number of scans: 3 scan/cycle
The flood gun is used for electrification correction)
<Sputtering Condition>
Sputtered ion: $C_{601}$ ion (1 nA, 20 keV)
Sputtering region: 800 μm×800 μm Hereinafter, specific embodiments of the present invention will be described with reference to the drawings.

FIG. 1 shows an interlayer film for laminated glass in accordance with a first embodiment of the present invention schematically represented as a sectional view.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2, and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The second layer 2 is a surface layer positioned at the first surface 11a side of the interlayer film 11. The second layer 2 is a surface layer positioned at the second surface 11b side of the interlayer film 11.

The first layer 1 is arranged between the second layer 2 and the third layer 3 to be sandwiched therebetween. Accordingly, the interlayer film 11 has a multilayer structure (a second layer 2/a first layer 1/a third layer 3) in which the second layer 2, the first layer 1, and the third layer 3 are layered in this order.

In this connection, other layers may be arranged between the second layer 2 and the first layer 1 and between the first layer 1 and the third layer 3, respectively. It is preferred that each of the second layer 2 and the third layer 3 be directly layered on the first layer 1. Examples of another layer include a layer containing polyethylene terephthalate and the like.

FIG. 2 shows an interlayer film for laminated glass in accordance with a second embodiment of the present invention schematically represented as a sectional view.

The interlayer film 11A shown in FIG. 2 is a single-layered interlayer film having a one-layer structure. The interlayer film 11A is singly constituted by a first layer. The interlayer film 11A is used for obtaining laminated glass. The interlayer film 11A is an interlayer film for laminated glass. The interlayer film 11A is a surface layer positioned at the first surface 11a side of the interlayer film 11A and is also a surface layer positioned at the second surface 11b side of the interlayer film 11A.

Hereinafter, the details of the first layer, the second layer and the third layer which constitute the interlayer film according to the present invention, and the details of each ingredient contained in the first layer, the second layer and the third layer will be described.

(Polyvinyl Acetal Resin or Thermoplastic Resin)

The first layer preferably contains a thermoplastic resin (hereinafter, sometimes described as a thermoplastic resin (1)) and preferably contains a polyvinyl acetal resin (hereinafter, sometimes described as a polyvinyl acetal resin (1)) as the thermoplastic resin (1). The second layer preferably contains a thermoplastic resin (hereinafter, sometimes described as a thermoplastic resin (2)) and preferably contains a polyvinyl acetal resin (hereinafter, sometimes described as a polyvinyl acetal resin (2)) as the thermoplastic resin (2). The third layer preferably contains a thermoplastic resin (hereinafter, sometimes described as a thermoplastic resin (3)) and preferably contains a polyvinyl acetal resin (hereinafter, sometimes described as a polyvinyl acetal resin (3)) as the thermoplastic resin (3). Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further heightened. The thermoplastic resin (2) and the thermoplastic resin (3) may be the same as or different from each other. One kind of each of the polyvinyl acetal resin (1), the polyvinyl acetal resin (2), and the polyvinyl acetal resin (3) may be used alone, and two or more kinds thereof may be used in combination. One kind of each of the thermoplastic resin (2) and the thermoplastic resin (3) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. It is preferred that the poiyvinyl acetal resin be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content of the hydroxyl group (the amount of hydroxyl groups) of the polyvinyl acetal resin (1) is preferably 17% by mole or more, more preferably 20% by mole or more, further preferably 22% by mole or more, preferably 30% by mole or less, more preferably less than 27% by mole, and further preferably 25% by mole or less. When the content of the hydroxyl group is the above lower limit or more, the adhesive force of the interlayer film is further heightened. In particular, when the content of the hydroxyl group of the polyvinyl acetal resin (1) is 20% by mole or more, the resin is high in reaction efficiency and is excellent in productivity, and moreover, when less than 27% by mole, the sound insulating properties of laminated glass are further heightened. Moreover, when the content of the hydroxyl group is the above upper limit or less, the flexibility of the interlayer film is enhanced and the handling of the interlayer film is facilitated.

In the case where the interlayer film is single-layered or the case where the first layer is an outermost layer of the interlayer film, the content of the hydroxyl group (the amount of hydroxyl groups) of the polyvinyl acetal resin (1) is preferably 25% by mole or more, more preferably 27% by mole or more, further preferably 29% by mole or more, preferably 38% by mole or less, more preferably 36% by mole or less, further preferably 34% by mole or less, and especially preferably 32% by mole or less. When the content of the hydroxyl group is the above lower limit or more, the mechanical strength of the interlayer film is further heightened. In particular, when the content of the hydroxyl group of the polyvinyl acetal resin (1) is 27% by mole or more, the resin is high in reaction efficiency and is excellent in productivity. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, especially preferably 33% by mole or more, preferably 37% by mole or less, more preferably 36.5% by mole or less, and further preferably 36% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of still further heightening the sound insulating properties, the absolute value of the difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, and most preferably 12% by mole or more. The absolute value of the difference between the content of the hydroxyl group of the polyvinyl acetal resin (1) and the content of the hydroxyl group of the polyvinyl acetal resin (2) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, preferably 30% by mole or less, more preferably 25% by mole or less, and further preferably 24% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

In the case where the interlayer film is single-layered or the case where the first layer is an outermost layer of the interlayer film, the acetylation degree (the amount of acetyl groups) of the polyvinyl acetal resin (1) is preferably 0.01% by mole or more, more preferably 0.1% by mole or more, even more preferably 0.5% by mole or more, further preferably 0.8% by mole or more, preferably 10% by mole or less, more preferably 5% by mole or less, and further preferably 3% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree of each of the polyvinyl acetal resin (2) and the polyvinyl acetal resin (3) is preferably 0.01% by mole or more, more preferably 0.5% by mole or more, preferably 10% by mole or less, and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more, preferably 85% by mole or less, more preferably 80% by mole or less and further preferably 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

In the case where the interlayer film is single-layered or the case where the first layer is an outermost layer of the interlayer film, the acetalization degree of the polyvinyl acetal resin (1) (the butyralization degree in the case of a polyvinyl butyral resin) is preferably 60% by mole or more, more preferably 65% by mole or more, preferably 72% by mole or less, more preferably 70% by mole or less, and further preferably 69% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 60% by mole or more, preferably 75% by mole or less and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (2) and the polyvinyl acetal resin (3) may be the polyvinyl acetal resin (A) and may be the polyvinyl acetal resin (B).

The acetylation degree (a) of the polyvinyl acetal resin (A) is less than 8% by mole, preferably 7.9% by mole or less, more preferably 7.8% by mole or less, further preferably 6.5% by mole or less, especially preferably 6% by mole or less, preferably 0.1% by mole or more, more preferably 0.5% by mole or more, further preferably 5% by mole or more and especially preferably 5.5% by mole or more. When the acetylation degree (a) is 0.1% by mole or more and less than 8% by mole, the transfer of a plasticizer can be easily controlled and the sound insulating properties of laminated glass are further heightened.

The acetalization degree (a) of the polyvinyl acetal resin (A) is 65% by mole or more, preferably 66% by mole or more, more preferably 67% by mole or more, further preferably 67.5% by mole or more, especially preferably 75% by mole or more, preferably 85% by mole or less, more preferably 84% by mole or less, further preferably 83% by mole or less and especially preferably 82% by mole or less. When the acetalization degree (a) is the above lower limit or more, the sound insulating properties of laminated glass are further heightened. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, most preferably 23% by mole or more, preferably 31% by mole or less, more preferably 30% by mole or less, further preferably 29% by mole or less and especially preferably 28% by mole or less. When the content (a) of the hydroxyl group is the above lower limit or more, the adhesive force of the interlayer film is further heightened. When the content (a) of the hydroxyl group is the above upper limit or less, the sound insulating properties of laminated glass are further heightened.

The acetylation degree (b) of the polyvinyl acetal resin (B) is 8% by mole or more, preferably 9% by mole or more, more preferably 9.5% by mole or more, further preferably 10% by mole or more, especially preferably 10.5% by mole or more, preferably 30% by mole or less, more preferably 28% by mole or less, further preferably 26% by mole or less and especially preferably 24% by mole or less. When the acetylation degree (b) is the above lower limit or more, the sound insulating properties of laminated glass are further heightened. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, preferably 78% by mole or less, more preferably 75% by mole or less, further preferably 72% by mole or less and especially preferably 70% by mole or less. When the acetalization degree (b) is the above lower limit or more, the sound insulating properties of laminated glass are further heightened. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, most preferably 23% by mole or more, preferably 31% by mole or less, more preferably 30% by mole or less, further preferably 29% by mole or less and especially preferably 28% by mole or less. When the content (b) of the hydroxyl group is the above lower limit or more, the adhesive force of the interlayer film is further heightened. When the content (b) of the hydroxyl group is the above upper limit or less, the sound insulating properties of laminated glass are further heightened.

It is preferred that each of the polyvinyl acetal resin (A) and the polyvinyl acetal resin (B) be a polyvinyl butyral resin.

(Plasticizer)

It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the adhesive force of a layer containing the polyvinyl acetal resin and the plasticizer to a lamination glass member or another layer is moderately heightened. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicapryiate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

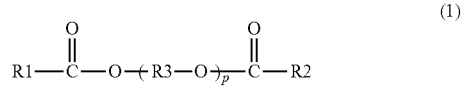

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

Each of the content of the plasticizer (2) (hereinafter, sometimes described as the content (2)) relative to 100 parts by weight of the thermoplastic resin (2) (100 parts by weight of a polyvinyl acetal resin (2) when the thermoplastic resin (2) is the polyvinyl acetal resin (2)) and the content of the plasticizer (3) (hereinafter, sometimes described as the content (3)) relative to 100 parts by weight of the thermoplastic resin (3) (100 parts by weight of a polyvinyl acetal resin (3) when the thermoplastic resin (3) is the polyvinyl acetal resin (3)) is preferably 10 parts by weight or more, more preferably 15 parts by weight or more, preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

The content of the plasticizer (1) (hereinafter, sometimes described as the content (1)) relative to 100 parts by weight of the thermoplastic resin (1) (100 parts by weight of a polyvinyl acetal resin (1) when the thermoplastic resin (1) is the polyvinyl acetal resin (1)) is preferably 50 parts by weight or more, more preferably 55 parts by weight or more, further preferably 60 parts by weight or more, preferably 90 parts by weight or less, more preferably 85 parts by weight or less, and further preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the case where the interlayer film is single-layered or the case where the first layer is an outermost layer of the interlayer film, the content of the plasticizer (1) (hereinafter, sometimes described as the content (1)) relative to 100 parts by weight of the thermoplastic resin (1) (100 parts by weight of a polyvinyl acetal resin (1) when the thermoplastic resin (1) is the polyvinyl acetal resin (1)) is preferably 20 parts by weight or more, more preferably 25 parts by weight or more, further preferably 30 parts by weight or more, especially preferably 35 parts by weight or more, preferably 50 parts by weight or less, more preferably 45 parts by weight or less, and further preferably 40 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3). In particular, from the viewpoint of further heightening the sound insulating properties of laminated glass, each of the absolute value of the difference between the content (2) and the content (1) and the absolute value of the difference between the content (3) and the content (1) is preferably 10 parts by weight or more, more preferably 15 parts by weight or more, and further preferably 20 parts by weight or more. Each of the absolute value of the difference between the content (2) and the content (1) and the absolute value of the difference between the content (3) and the content (1) is preferably 80 parts by weight or less, more preferably 75 parts by weight or less, and further preferably 70 parts by weight or less.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.83}WO_3$.

The average particle diameter of the heat shielding particles is preferably 0.01 μm or more, more preferably 0.02 μm or more, preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), each content of the heat shielding particles is preferably 0.01% by weight or more, more preferably 0.1% by weight; or more, further preferably 1% by weight or more, especially preferably 1.5% by weight or more, preferably 6% by weight or less, more preferably 5.5% by weight or less, further preferably 4% by weight or less, especially preferably 3.5% by weight or less and most preferably 3% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that each of the interlayer film, a surface layer positioned at the first surface side of the interlayer film, and a surface layer positioned at the second surface side of the interlayer film contain a compound containing potassium and it is preferred that the compound containing potassium be constituted of a potassium salt. Although the potassium salt is not particularly limited, it is preferred that the potassium salt be a potassium salt of an organic acid with 2 to 16 carbon atoms and examples thereof include potassium acetate, potassium propionate, potassium 2-ethylbutanoate, potassium 2-ethylhexanoate, and the like. When an interlayer film contains a potassium salt and contains neither a magnesium salt nor an alkaline earth metal salt, it is difficult to adjust the adhesive force of the interlayer film to a glass plate. Even if an inter layer film contains at least one kind among a magnesium salt and an alkaline earth metal salt in addition to a potassium salt, it is sometimes difficult to adjust the adhesive force of the interlayer film to a glass plate. However, by providing an interlayer film with the above-mentioned Number 1 requirement and making the interlayer film contain at least one kind among a magnesium salt and an alkaline earth metal salt, the adhesive force of the interlayer film to a glass plate can be adjusted as well as the moisture resistance of laminated glass is enhanced.

Each of the interlayer film, the surface layer positioned at the first surface side of the interlayer film, and the surface layer positioned at the second surface side of the interlayer film contains at least one kind among a magnesium salt and an alkaline earth metal salt. In particular, it is preferred that each of the interlayer film, the surface layer positioned at the first surface side of the interlayer film, and the surface layer positioned at the second surface side of the interlayer film contain a magnesium salt. Although the magnesium salt is not particularly limited, it is preferred that the magnesium salt be a magnesium carboxylate with 2 to 16 carbon atoms and examples thereof include magnesium acetate, magnesium propionate, magnesium 2-ethylbutyrate, magnesium 2-ethylhexanoate, and the like.

The total of the contents of Mg and K in a layer containing the above-mentioned metal salt (a surface layer, a first layer, a second layer, or a third layer) is preferably 5 ppm or more, more preferably 10 ppm or more, further preferably 20 ppm or more, preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

The content of Mg in each of the interlayer film, the surface layer positioned at the first surface side of the interlayer film, and the surface layer positioned at the second surface side of the interlayer film is preferably 5 ppm or more, more preferably 10 ppm or more, further preferably 20 ppm or more, preferably 300 ppm or less, more preferably 200 ppm or less, further preferably 150 ppm or less, and especially preferably 50 ppm or less.

The content of K in each of the interlayer film, the surface layer positioned at the first surface side of the interlayer film, and the surface layer positioned at the second surface side of the interlayer film is preferably 5 ppm or more, more preferably 10 ppm or more, further preferably 20 ppm or more, preferably 300 ppm or less, more preferably 200 ppm or less, further preferably 50 ppm or less, and especially preferably 40 ppm or less.

(Ultraviolet ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include ultraviolet ray screening agents having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzofcriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diaraide, N-(2-ethylphenyl)-N'-(2-ethoxyphenyl)oxalic acid diaraide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tertbutyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-dit-butyl-4-ethylphenol, stearyl β-(3,5-di-t-butyl-4-hydroxyphenyl), propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)

butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer and the third layer may contain additives such as a coupling agent containing silicon, aluminum or titanium, a dispersing agent, a surfactant, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance of laminated glass, the thickness of the interlayer film is preferably 0.1 mm or more, more preferably 0.25 mm or more, preferably 3 mm or less and more preferably 1.5 mm or less. When the thickness of the interlayer film is the above lower limit or more, the penetration resistance of laminated glass is enhanced. When the thickness of the interlayer film is the above upper limit or less, the transparency of the interlayer film is further improved.

It is preferred that the interlayer film be obtained by melt extrusion molding.

The production method of the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Since the production efficiency of the interlayer film is excellent, it is preferred that respective polyvinyl acetal resins contained in the second layer and the third layer be the same as each other, it is more preferred that respective polyvinyl acetal resins contained in the second layer and the third layer be the same as each other and respective plasticizers contained therein be the same as each other, and it is further preferred that the second layer and the third layer be formed from the same resin composition as each other.

(Laminated Glass)

FIG. 3 is a sectional view schematically showing an example of laminated glass prepared with the interlayer film for laminated glass shown in FIG. 1.

The laminated glass 31 shown in FIG. 3 is provided with a first lamination glass member 21, a second lamination glass member 22, and an interlayer film part 11'. The interlayer film part 11' is arranged between the first lamination glass member 21 and the second lamination glass member 22 to be sandwiched therebetween.

The interlayer film part 11' is formed of the interlayer film 11.

The first lamination glass member 21 is layered on a first surface 11a of the interlayer film part 11'. The second lamination glass member 22 is layered on a second surface 11b opposite to the first surface 11a of the interlayer film part 11'. The first lamination glass member 21 is layered on an outer surface 2a of a second layer 2. The second lamination glass member 22 is layered on an outer surface 3a of a third layer 3.

FIG. 4 is a sectional view schematically showing an example of laminated glass prepared with the interlayer film for laminated glass shown in FIG. 2.

The laminated glass 31A shown in FIG. 4 is provided with a first lamination glass member 21, a second lamination glass member 22 and an interlayer film part 11A'. The interlayer film part 11A' is arranged between the first lamination glass member 21 and the second lamination glass member 22 to be sandwiched therebetween.

The interlayer film part 11A' is formed of the interlayer film 11A.

The first lamination glass member 21 is layered on a first surface 11a of the interlayer film part 11A'. The second lamination glass member 22 is layered on a second surface 11b opposite to the first surface 11a of the interlayer film part 11A'.

As described above, the laminated glass is provided with a first lamination glass member, a second lamination glass member, and an interlayer film part and the interlayer film part is formed of the interlayer film for laminated glass according to the present invention. In the laminated glass, the above-mentioned interlayer film part is arranged between the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member. It is preferred that both of the first lamination glass member and the second lamination glass member be glass plates (a first glass plate and a second glass plate). The interlayer film is arranged between a first glass plate and a second glass plate to suitably obtain laminated glass.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less, and more preferably 3 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

Hereinafter, the present invention will be described in more detail with reference to examples. The present invention is not limited only to these examples.

The following materials were used in examples and comparative examples.

(Thermoplastic Resin)

Polyvinyl acetal resins shown in the following Table 2 were appropriately used. In all polyvinyl acetal resins used, n-butyraldehyde which has 4 carbon atoms is used for the acetalization.

With regard to the polyvinyl acetal resin, the acetalization degree (the butyralization degree), the acetylation degree, and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)
3GO (triethylene glycol di-2-ethylhexanoate)
(Metal Salt)
Potassium acetate
Magnesium 2-ethylbutyrate
(Ultraviolet Ray Screening Agent)
Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
BUT (2,6-di-t-butyl-p-cresol)

Example 1

Preparation of composition for forming interlayer film:
One hundred parts by weight of a polyvinyl acetal resin of a kind shown in the following Table 2, 40 parts by weight of a plasticizer of a kind shown in the following Table 2, 0.2 parts by weight of an ultraviolet ray screening agent (Tinuvin 326), potassium acetate in an amount that the content of potassium in the resulting interlayer film becomes 50 ppm, magnesium 2-ethylbutyrate in an amount that the content of magnesium in the resulting interlayer film becomes 35 ppm, and 0.2 parts by weight of an oxidation inhibitor (BHT) were mixed to obtain a composition for forming an interlayer film.

Preparation of Interlayer Film:
Using an extruder, the composition for forming an interlayer film was extruded. A sheet extruded was immersed in water at 20° C. for 30 seconds, after which, the sheet was subjected to an annealing treatment for 30 seconds at 130° C. to prepare a single-layered interlayer film (760 μm in thickness).

Preparation of Laminated Glass:
Two washed and dried sheets of transparent float glass (15 cm in longitudinal length×15 cm in transversal length×2.5 mm in thickness) were prepared. The obtained interlayer film was sandwiched between the two glass plates to obtain a laminate. The obtained laminate was put into a bag and the inside of the vacuum bag was degassed at a degree of vacuum of 933.2 hPa and at ordinary temperature (23° C.). Subsequently, the temperature inside the vacuum bag was elevated to 100° C. while maintaining the degassed state, and after the temperature reached 100° C., the laminate was held for 20 minutes. Afterward, the vacuum bag was allowed to spontaneously cool and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

Examples 2 to 4 and Comparative Example 1

In Examples 2 to 4 and Comparative Example 1, a single-layered interlayer film was prepared in the same manner as that in Example 1 except that the kind of ingredients to be blended and the content thereof were set to those listed in the following Table 2. With the use of the obtained interlayer film, a sheet of laminated glass provided with the interlayer film was prepared in the same manner as that in Example 1.

Moreover, in Examples 2 to 4 and Comparative Example 1, each of the ultraviolet ray screening agent and the oxidation inhibitor of the same kind as that in Example 1 was blended in the same blending amount (0.2 parts by weight relative to 100 parts by weight of the polyvinyl acetal resin) as that in Example 1.

In Example 2, potassium acetate in an amount that the content of potassium derived from potassium acetate in the resulting interlayer film becomes 200 ppm was used and magnesium 2-ethylbutyrate in an amount that the content of magnesium derived from magnesium 2-ethylbutyrate in the resulting interlayer film becomes 25 ppm was used. In Example 3, potassium acetate in an amount that the content of potassium in the resulting interlayer film becomes 60 ppm was used and magnesium 2-ethylbutyrate in an amount that the content of magnesium in the resulting interlayer film becomes 25 ppm was used. In Comparative Example 1, potassium acetate in an amount that the content of potassium in the resulting interlayer film becomes 105 ppm was used.

In Example 4, magnesium acetate in an amount that the content of magnesium in the resulting interlayer film becomes 20 ppm was used and potassium acetate in an amount that the content of potassium in the resulting interlayer film becomes 200 ppm was used.

(Evaluation)
(1) TOF-SIMS Evaluation

With the use of TOF-SIMS, a portion on a first surface of the interlayer film was measured for $Ratio_0$ of Ion Intensity of Potassium/Ion Intensity of Thermoplastic Resin (Polyvinyl Acetal Resin). Next, a sputtering and measurement process in which the first surface portion measured for $Ratio_0$ is subjected to sputtering one time and measured for Ratio of Ion Intensity of Potassium/Ion Intensity of Thermoplastic Resin (Polyvinyl Acetal Resin) with the use of TOF-SIMS was performed n times to collect n Rations of Ion Intensity of Potassium/Ion Intensity of Thermoplastic Resin (Polyvinyl Acetal Resin) obtained from the first to n-th sputtering and measurement processes. Measurement conditions are as defined above.

(2) Moisture Resistance

The sheet of laminated glass obtained was allowed to settle for two weeks under an environment of 80° C. and a humidity of 95% RH, after which the length of a whitened portion extending from the midpoint of each of four sides of the sheet of laminated glass was measured. Among four measured values of the length of a whitened portion extending from the midpoint of each of four sides of the sheet of laminated glass, the largest value of the length of a whitened portion was evaluated.

(3) Adhesive Force (Pummel)

The obtained interlayer films were allowed to stand under high humidity to obtain an interlayer film with a water content of 0.3% by weight, an interlayer film with a water content of 0.5% by weight, and an interlayer film with a water content of 0.7% by weight.

Two washed and dried sheets of transparent float glass (15 cm in longitudinal length×30 cm in transversal length×2.5 mm in thickness) were prepared. The interlayer film adjusted in its water content was sandwiched between the two glass plates to obtain a laminate. The obtained laminate was put into a bag and the inside of the vacuum bag was degassed at a degree of vacuum of 933.2 hPa and at ordinary temperature (23° C.). Subsequently, the temperature inside the vacuum bag was elevated to 100° C. while maintaining the degassed state, and after the temperature reached 100° C., the laminate was held for 20 minutes. Afterward, the vacuum bag was allowed to spontaneously cool and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

The obtained sheet of laminated glass (15 cm in longitudinal length×30 cm in transversal length) was stored at −18° C.±0.6° C. for 16 hours. The center part (the area of 15 cm in longitudinal length×15 cm in transversal length) of the sheet of laminated glass after storage was struck and broken by a hammer with a head of 0.45 kg until broken pieces of glass were allowed to have a particle diameter of 6 mm or less. The center part (the area of 15 cm in longitudinal length×15 cm in transversal length) of the sheet of laminated glass was broken, after which the degree of exposure of the interlayer film (% by area) was measured to determine the pummel value according to the following Table 1. An average value of 6 measured values was adopted as the pummel value.

TABLE 1

| Degree of exposure of interlayer film (% by area) | Pummel value |
| --- | --- |
| 90 < Degree of exposure ≤ 100 | 1 |
| 85 < Degree of exposure ≤ 90 | 2 |
| 60 < Degree of exposure ≤ 85 | 3 |
| 40 < Degree of exposure ≤ 60 | 4 |
| 20 < Degree of exposure ≤ 40 | 5 |
| 10 < Degree of exposure ≤ 20 | 6 |
| 5 < Degree of exposure ≤ 10 | 7 |
| 2 < Degree of exposure ≤ 5 | 8 |
| Degree of exposure ≤ 2 | 9 |

The results are shown in the following Table 2. In this connection, in the following Table 2, the description of ingredients to be blended other than the thermoplastic resin (polyvinyl acetal resin), the plasticizer, and the metal salt was omitted.

TABLE 2

| | | | Example 1 | Example 2 | Example 3 | Comparative Example 1 | Example 4 |
| --- | --- | --- | --- | --- | --- | --- | --- |
| Interlayer film | Polyvinyl acetal resin | Content (parts by weight) | 100 | 100 | 100 | 100 | 100 |
| | | Average polymerization degree | 1700 | 1700 | 1700 | 1700 | 1700 |
| | | Content of hydroxyl group (mol %) | 30.5 | 30.5 | 30.5 | 30.5 | 30.5 |

TABLE 2-continued

|  |  |  | Example 1 | Example 2 | Example 3 | Comparative Example 1 | Example 4 |
|---|---|---|---|---|---|---|---|
|  |  | Acetalization degree (mol %) | 68.7 | 68.7 | 68.7 | 68.7 | 68.7 |
|  |  | Acetylation degree (mol %) | 0.8 | 0.8 | 0.8 | 0.8 | 0.8 |
|  | Plasticizer | Kind | 3GO | 3GO | 3GO | 3GO | 3GO |
|  |  | Content (parts by weight) | 40 | 40 | 40 | 40 | 40 |
|  | Metal salt | Magnesium salt | Magnesium 2-ethylbutyrate | Magnesium 2-ethylbutyrate | Magnesium 2-ethylbutyrate | — | Magnesium acetate |
|  |  | Potassium salt | Potassium acetate | Potassium acetate | Potassium acetate | Potassium acetate | Potassium acetate |
|  |  | Content of magnesium (ppm) | 35 | 25 | 25 | — | 20 |
|  |  | Content of potassium (ppm) | 50 | 200 | 60 | 105 | 200 |
| Evaluation | TOF-SIMS measurement | Average value$_{1 \leq n \leq 10}$ | 0.5888 | 1.4506 | 0.5638 | 0.7514 | 1.1566 |
|  |  | Average value$_{s1 \leq n \leq 60}$ | 0.4485 | 0.7477 | 0.4926 | 0.6163 | 0.8956 |
|  |  | Average value$_{1 \leq n \leq 150}$ | 0.4495 | 0.8351 | 0.5013 | 0.6456 | 0.9375 |
|  |  | Average value$_{1 \leq n \leq 10}$/ Average value$_{1 \leq n \leq 60}$ | 1.31 | 1.94 | 1.14 | 1.22 | 1.29 |
|  |  | Average value$_{1 \leq n \leq 10}$/ Average value$_{1 \leq n \leq 150}$ | 1.31 | 1.74 | 1.12 | 1.16 | 1.23 |
|  | Moisture resistance (length of whitened portion (mm)) |  | 5 | 3 | 2 | 6 | 7 |
|  | Adhesive force (Pummel) | Water content 0.3% by weight | 7 | 6 | 6 | 9 | 2 |
|  |  | Water content 0.5% by weight | 4 | 6 | 5 | 8 | 8 |
|  |  | Water content 0.7% by weight | 4 | 7 | 6 | 8 | 7 |

In this connection, in Examples 1 to 4 and Comparative Example 1, a single-layered interlayer film was prepared so that the first surface and the second surface, which constitute both surface sides of the single-layered interlayer film, were made to be the same as each other. Although the evaluation result of the TOF-SIMS evaluation at the first surface side was shown, the TOF-SIMS evaluation result at the second surface side was determined to be approximately the same as the evaluation result of the TOF-SIMS evaluation at the first surface side.

EXPLANATION OF SYMBOLS

1: First layer
1a: First surface
1b: Second surface
2: Second layer
2a: Outer surface
3: Third layer
3a: Outer surface
11: Interlayer film
11': Interlayer film part
11A: Interlayer film (First layer)
11A': Interlayer film part
11a: First surface
11b: Second surface
21: First lamination glass member
22: Second lamination glass member
31: Laminated glass
31A: Laminated glass

The invention claimed is:

1. An interlayer film for laminated glass, a one-layer structure or a two or more-layer structure,
   containing a thermoplastic resin, and
   containing at least one kind among a magnesium salt and an alkaline earth metal salt,
   wherein a portion on a first surface of the interlayer film is measured for Ratio® of Ion Intensity of Potassium/Ion Intensity of Thermoplastic Resin with the use of TOF-SIMS, then,
   a sputtering and measurement process in which the first surface portion measured for Ratio® is subjected to sputtering one time and measured for Ratio of Ion Intensity of Potassium/Ion Intensity of Thermoplastic Resin with the use of TOF-SIMS is performed n times, and n Ratio$_n$s of Ion Intensity of Potassium/Ion Intensity of Thermoplastic Resin obtained from the first to n-th sputtering and measurement processes are collected to calculate an average value$_{1 \leq n \leq 10}$ of 10 values of Ratio$_{1 \leq n \leq 10}$ measured within a range of $1 \leq n \leq 10$ and an average value$_{1 \leq n \leq 150}$ of 150 values of Ratio$_{1 \leq n \leq 150}$ measured within a range of $1 \leq n \leq 150$,
   the average value$_{1 \leq n \leq 10}$ being more than 1.1 times the average value$_{1 \leq n \leq 150}$.

2. The interlayer film for laminated glass according to claim 1, wherein the average value$_{1 \leq n \leq 10}$ of 10 values of Ratio$_{1 \leq n \leq 10}$ measured within a range of $1 \leq n \leq 10$ is 1.1 times or more of the average value$_{1 \leq n \leq 60}$ of 10 values of Ratio$_{1 \leq n \leq 60}$ measured within a range of $51 \leq n \leq 60$.

3. The interlayer film for laminated glass according to claim 1, wherein the average value$_{1 \leq n \leq 10}$ of 10 values of Ratio$_{1 \leq n \leq 10}$ measured within a range of $1 \leq n \leq 10$ is 1.25 times or more of the average value$_{1 \leq n \leq 150}$ of 150 values of Ratio$_{1 \leq n \leq 150}$ measured within a range of $1 \leq n \leq 150$.

4. The interlayer film for laminated glass according to claim 1, wherein a surface layer positioned at the first surface side contains magnesium.

5. The interlayer film for laminated glass according to claim 1, wherein the content of magnesium in a surface layer positioned at the first surface side is less than 50 ppm.

6. The interlayer film for laminated glass according to claim 1, wherein the content of potassium in a surface layer positioned at the first surface side is 300 ppm or less.

7. The interlayer film for laminated glass according to claim 1, wherein the thermoplastic resin is a polyvinyl acetal resin.

8. The interlayer film for laminated glass according to claim 1, wherein
- a portion on a second surface of the interlayer film is measured for $\text{Ratio}_0$ of Ion Intensity of Potassium/Ion Intensity of Thermoplastic Resin with the use of TOF-SIMS, then,
- a sputtering and measurement process in which the second surface portion measured for $\text{Ratio}_0$ is subjected to sputtering one time and measured for Ratio of Ion Intensity of Potassium/Ion Intensity of Thermoplastic Resin with the use of TOF-SIMS is performed m times, and m $\text{Ratio}_m$s of Ion Intensity of Potassium/Ion Intensity of Thermoplastic Resin obtained from the first to m-th sputtering and measurement processes are collected to calculate an average $\text{value}_{1 \leq m \leq 10}$ of 10 values of $\text{Ratio}_{1 \leq m \leq 10}$ measured within a range of $1 \leq m \leq 10$ and an average $\text{value}_{1 \leq m \leq 150}$ of 150 values of $\text{Ratio}_{1 \leq m \leq 150}$ measured within a range of $1 \leq m \leq 150$,
- the average $\text{value}_{1 \leq m \leq 10}$ is more than 1.1 times the average $\text{value}_{1 \leq m \leq 150}$.

9. A laminated glass, comprising:
- a first lamination glass member;
- a second lamination glass member; and
- an interlayer film part arranged between the first lamination glass member and the second lamination glass member,
- the interlayer film part being formed of the interlayer film for laminated glass according to claim 1.

* * * * *